US012576444B2

(12) United States Patent
    Akashi

(10) Patent No.:     US 12,576,444 B2
(45) Date of Patent:     Mar. 17, 2026

(54) WORKPIECE TRANSPORT DEVICE

(71) Applicant: KOMATSU INDUSTRIES CORPORATION, Kanazawa (JP)

(72) Inventor: Hidetoshi Akashi, Kanazawa (JP)

(73) Assignee: KOMATSU INDUSTRIES CORPORATION, Kanazawa (JP)

( * ) Notice: Subject to any disclaimer, the term of this patent is extended or adjusted under 35 U.S.C. 154(b) by 507 days.

(21) Appl. No.: 17/928,687

(22) PCT Filed: Jun. 17, 2021

(86) PCT No.: PCT/JP2021/022985
    § 371 (c)(1),
    (2) Date: Nov. 30, 2022

(87) PCT Pub. No.: WO2022/030111
    PCT Pub. Date: Feb. 10, 2022

(65) Prior Publication Data
    US 2023/0226589 A1     Jul. 20, 2023

(30) Foreign Application Priority Data

Aug. 6, 2020    (JP) ................................ 2020-133882

(51) Int. Cl.
    *B21D 43/28*       (2006.01)
    *B21D 43/05*       (2006.01)
    *B25J 11/00*       (2006.01)
    *B30B 15/30*       (2006.01)
    *B65G 47/91*       (2006.01)
(52) U.S. Cl.
    CPC ......... *B21D 43/287* (2013.01); *B21D 43/055* (2013.01); *B25J 11/00* (2013.01); *B30B 15/30* (2013.01); *B65G 47/914* (2013.01)

(58) Field of Classification Search
    CPC ...... B30B 15/30; B30B 15/32; D21D 24/005; D21D 43/04; D21D 43/05; D21D 43/105;
    (Continued)

(56) References Cited

U.S. PATENT DOCUMENTS 4,614,265 A     9/1986 Glasberg
    6,073,551 A  *  6/2000 Dangelmayr ............ B23Q 1/50
                                              198/621.3
    (Continued)

FOREIGN PATENT DOCUMENTS

CN     102470420 A     5/2012
    CN     105522066 A     4/2016
    (Continued)

*Primary Examiner* — Jimmy T Nguyen
(74) *Attorney, Agent, or Firm* — Faegre Drinker Biddle & Reath LLP

(57)          ABSTRACT

A workpiece transport device capable of improving a workpiece transport speed to increase productivity is provided. The workpiece transport device transports a workpiece pressed by a press machine. The workpiece transport device includes a base portion, a crossbar that holds the workpiece, a parallel mechanism, and a motor. The parallel mechanism is supported on the base portion. The parallel mechanism is configured to change a position of the crossbar relative to the base portion by operating in a plane defined by a transport direction in which the workpiece is transported and an up-down direction. The motor generates a driving force for driving the parallel mechanism. The motor is mounted on the base portion.

10 Claims, 12 Drawing Sheets

(58) Field of Classification Search
CPC ...... D21D 43/287; D21D 43/10; D21D 43/18;
D21D 47/914; B65G 47/914; B65G
47/52; B65J 11/00; B65J 9/009; B65J
19/0012; B65J 9/107; Y10S 414/13;
B21D 24/005; B21D 43/04; B21D 43/05;
B21D 43/105; B21D 43/287; B21D
43/10; B21D 43/18; B21D 47/914; B21D
43/055; B21D 43/052; B25J 11/00; B25J
9/009; B25J 19/0012; B25J 9/107
See application file for complete search history.

(56) References Cited

U.S. PATENT DOCUMENTS

| | | | |
|---|---|---|---|
| 6,612,229 B2 | 9/2003 | Hofele et al. | |
| 7,287,950 B2 * | 10/2007 | Schmeink | ............ B65G 47/914 |
| | | | 100/207 |
| 10,376,945 B2 * | 8/2019 | Akashi | ................. B21D 43/055 |
| 2012/0114451 A1 | 5/2012 | Nishida et al. | |
| 2018/0281047 A1 | 10/2018 | Akashi | |
| 2019/0015973 A1 | 1/2019 | Ooba | |

FOREIGN PATENT DOCUMENTS

| | | | | |
|---|---|---|---|---|
| CN | 107530758 A | | 1/2018 | |
| DE | 102005004387 A1 * | | 8/2005 | ............. B21D 43/05 |
| DE | 102018116413 A1 * | | 1/2019 | ............. B25J 9/0093 |
| JP | S62-64438 A | | 3/1987 | |
| JP | 2005-211965 A | | 8/2005 | |
| JP | 2005-230995 A | | 9/2005 | |
| JP | 2006175518 A | * | 7/2006 | |
| JP | 2013-129007 A | | 7/2013 | |
| JP | 2017-30015 A | | 2/2017 | |
| JP | 2019-18339 A | | 2/2019 | |
| WO | WO-2011/004644 A1 | | 1/2011 | |
| WO | WO-2018121838 A1 * | | 7/2018 | .............. B25J 9/009 |

* cited by examiner

FIG.12
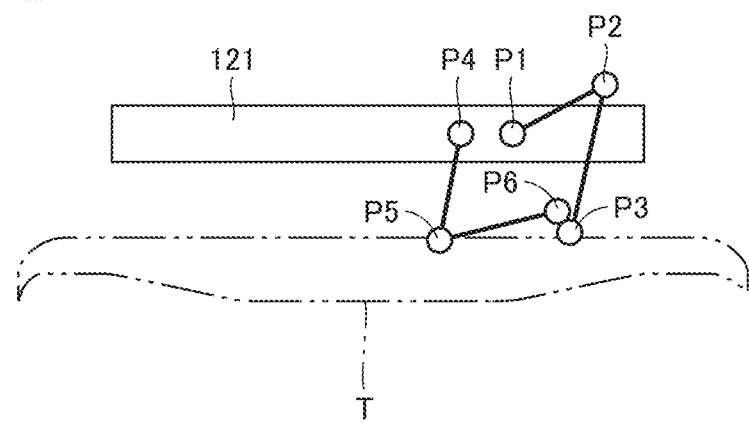
FIG.13
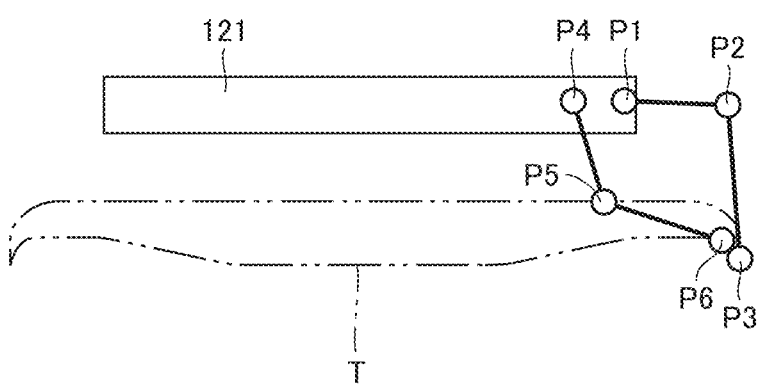
FIG.14

WORKPIECE TRANSPORT DEVICE

TECHNICAL FIELD

The present disclosure relates to a workpiece transport device.

BACKGROUND ART

Japanese Patent Laying-Open No. 2005-211965 (PTL 1) discloses a transport robot that automatically transports workpieces between press machines.

The transport robot described in the above literature includes: a pair of drive units disposed on one side and the other side of a first press machine and a second press machine, respectively; and a crossbar extending into a space between the press machines and connecting the pair of drive units. Each drive unit includes: a guide member extending in a direction in which the press machines are connected; a travel member capable of traveling on the guide member; and a swing member having one end supported on the travel member and the other end capable of swinging in the direction in which the press machines are connected. The cross bar has one end and the other end coupled to the other ends of the respective swing members, and has a holding portion that holds a workpiece in a middle portion. The swing member includes a first swing member having one end supported on the travel member, and a second swing member having one end supported on the other end of the first swing member. A motor for swinging the second swing member is attached to one end of the second swing member.

CITATION LIST

Patent Literature

PTL 1: Japanese Patent Laying-Open No. 2005-211965

SUMMARY OF INVENTION

Technical Problem

In the transport robot described in the above literature, the motor is provided on the swing member. Thus, even if the motor is increased in size in order to increase a workpiece transport speed, the transport speed cannot be sufficiently increased due to an increased weight of the swing member.

The present disclosure proposes a workpiece transport device capable of improving a workpiece transport speed to increase productivity.

Solution to Problem

According to the present disclosure, a workpiece transport device that transports a workpiece pressed by a press machine is proposed. The workpiece transport device includes a base portion, a holding portion that holds the workpiece, a parallel mechanism, and an actuator. The parallel mechanism is supported on the base portion. The parallel mechanism is configured to change a position of the holding portion relative to the base portion by operating in a plane defined by a transport direction in which the workpiece is transported and an up-down direction. The actuator generates a driving force for driving the parallel mechanism. The actuator is mounted on the base portion.

Advantageous Effects of Invention

The workpiece transport device according to the present disclosure can improve a workpiece transport speed to increase productivity.

BRIEF DESCRIPTION OF DRAWINGS

FIG. 12 is a fourth diagram showing movement of the crossbar along the operation trajectory.

FIG. 13 is a fifth diagram showing movement of the crossbar along the operation trajectory.

FIG. 14 is a sixth diagram showing movement of the crossbar along the operation trajectory.

DESCRIPTION OF EMBODIMENTS

Figure 1:
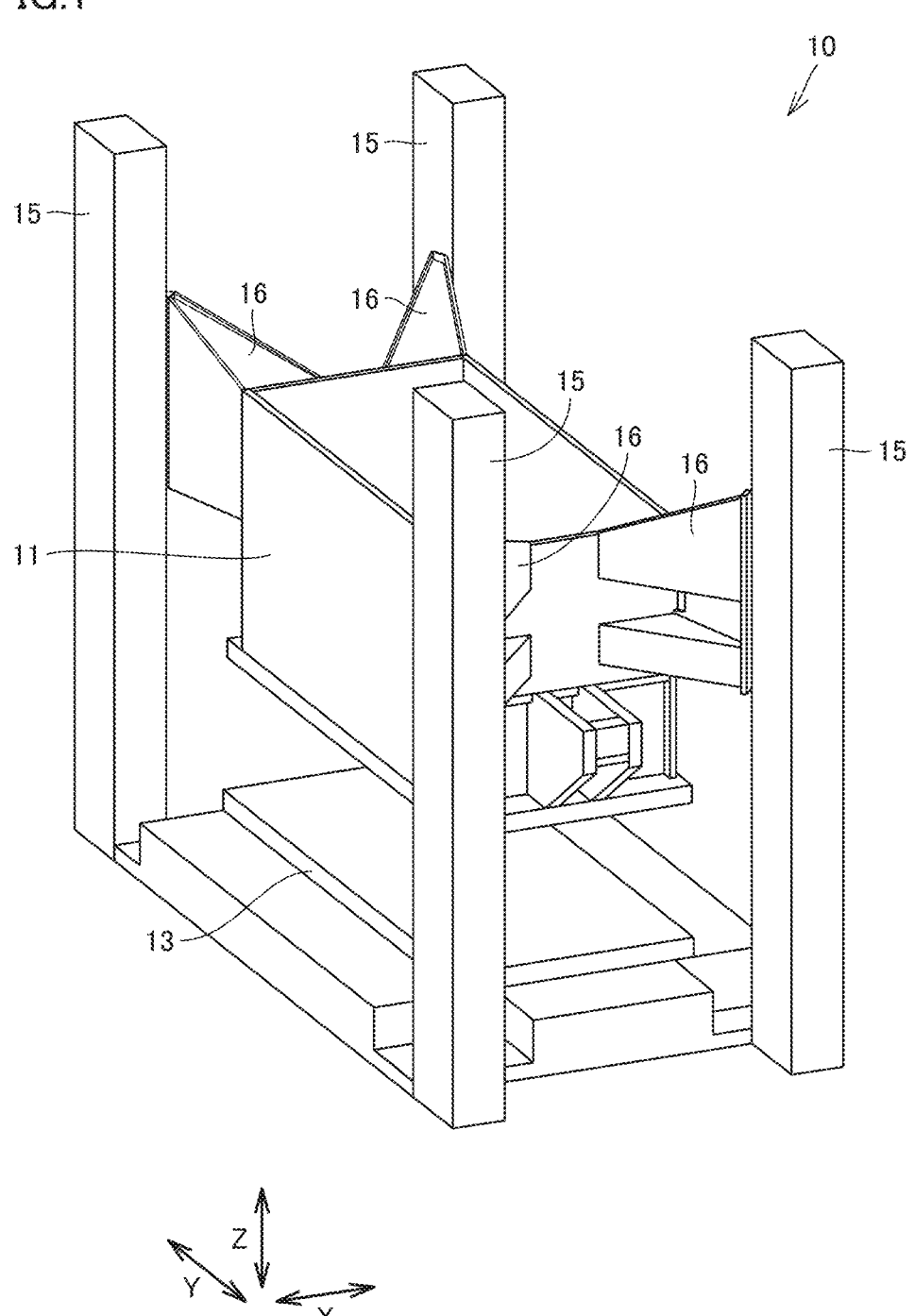
FIG. 1 is a perspective view of a press machine.

Embodiments are described hereinafter based on the drawings. In the description below, the same parts are denoted by the same reference characters. Their labels and functions are also the same. Therefore, detailed description thereof will not be repeated.

First Embodiment

FIG. 1 is a perspective view of a press machine 10 that presses a workpiece, to which a workpiece transport device according to an embodiment is applied. A workpiece pressed by a press system including press machine 10 and a press machine 20 to be described later is, for example, an automobile exterior panel. As shown in FIG. 1, press machine 10 mainly includes a slide 11, a bolster 13, and uprights 15. Uprights 15 are columnar members. Four uprights 15 are disposed at vertices of a rectangle in a plan view. A crown (not shown) is supported by four uprights 15. The crown is disposed over the four uprights. Uprights 15 correspond to columnar portions in the embodiment.

Slide 11 is disposed to be surrounded by four uprights 15. Slide 11 is suspended from the crown over uprights 15, and is movable in the up-down direction with respect to the crown. On a lower end portion of slide 11, an upper die 12

(not shown in FIG. 1) is detachably mounted. Slide 11 is attached to uprights 15 by four slide arms 16 so as to be movable in the up-down direction. Slide arms 16 correspond to attachment portions in the embodiment. Slide 11 is positioned with respect to each upright 15 by four slide arms 16. Slide arms 16 are slidable with respect to uprights 15.

In the figure, double arrows indicate a transport direction X in which the workpiece is transported, an up-down direction Z in which uprights 15 extend and slide 11 and upper die 12 move, and a right-left direction Y orthogonal to transport direction X and orthogonal to up-down direction Z.

Bolster 13 is disposed to be surrounded by four uprights 15. On an upper surface of bolster 13, a lower die 14 (not shown in FIG. 1) is mounted. As slide 11 moves in up-down direction Z, upper die 12 moves in up-down direction Z together with slide 11, thus moving closer to and away from lower die 14. The workpiece is sandwiched between upper die 12 and lower die 14 and then pressed.

Figure 2:
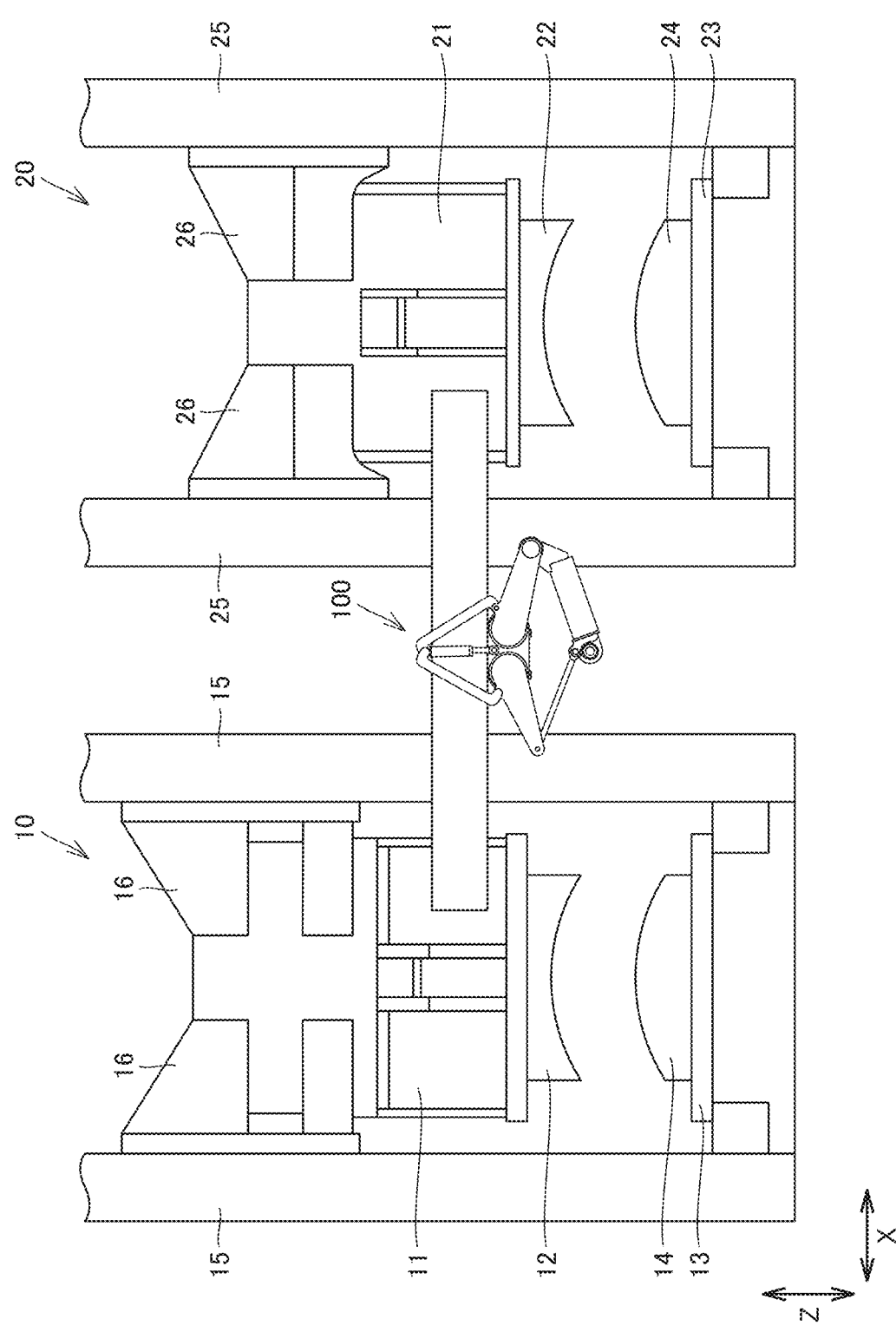
FIG. 2 is a side view of a press system.

FIG. 2 is a side view of a press system including a plurality of press machines and a workpiece transport device 100 that transports a workpiece between the press machines. FIG. 2 shows two press machines 10 and 20 of the plurality of press machines included in the press system, and workpiece transport device 100 provided between press machine 10 and press machine 20 to transport a workpiece from press machine 10 on the upstream side to press machine 20 on the downstream side in transport direction X.

Press machine 10 and press machine 20 are disposed side by side and spaced apart from each other in transport direction X. Press machine 20 includes a slide 21, an upper die 22, a bolster 23, a lower die 24, four uprights 25, and four slide arms 26, which are similar to those of press machine 10 described with reference to FIG. 1.

Workpiece transport device 100 transports a workpiece between a space between upper die 12 and lower die 14 of press machine 10, and a space between upper die 22 and lower die 24 of press machine 20. The workpiece that has been sandwiched between upper die 12 and lower die 14 of press machine 10 and pressed is delivered from press machine 10 to press machine 20, and is then sandwiched between upper die 22 and lower die 24 of press machine 20 and pressed. The plurality of press machines including press machines 10 and 20 form a tandem press line, and successively process workpieces.

Figure 3:
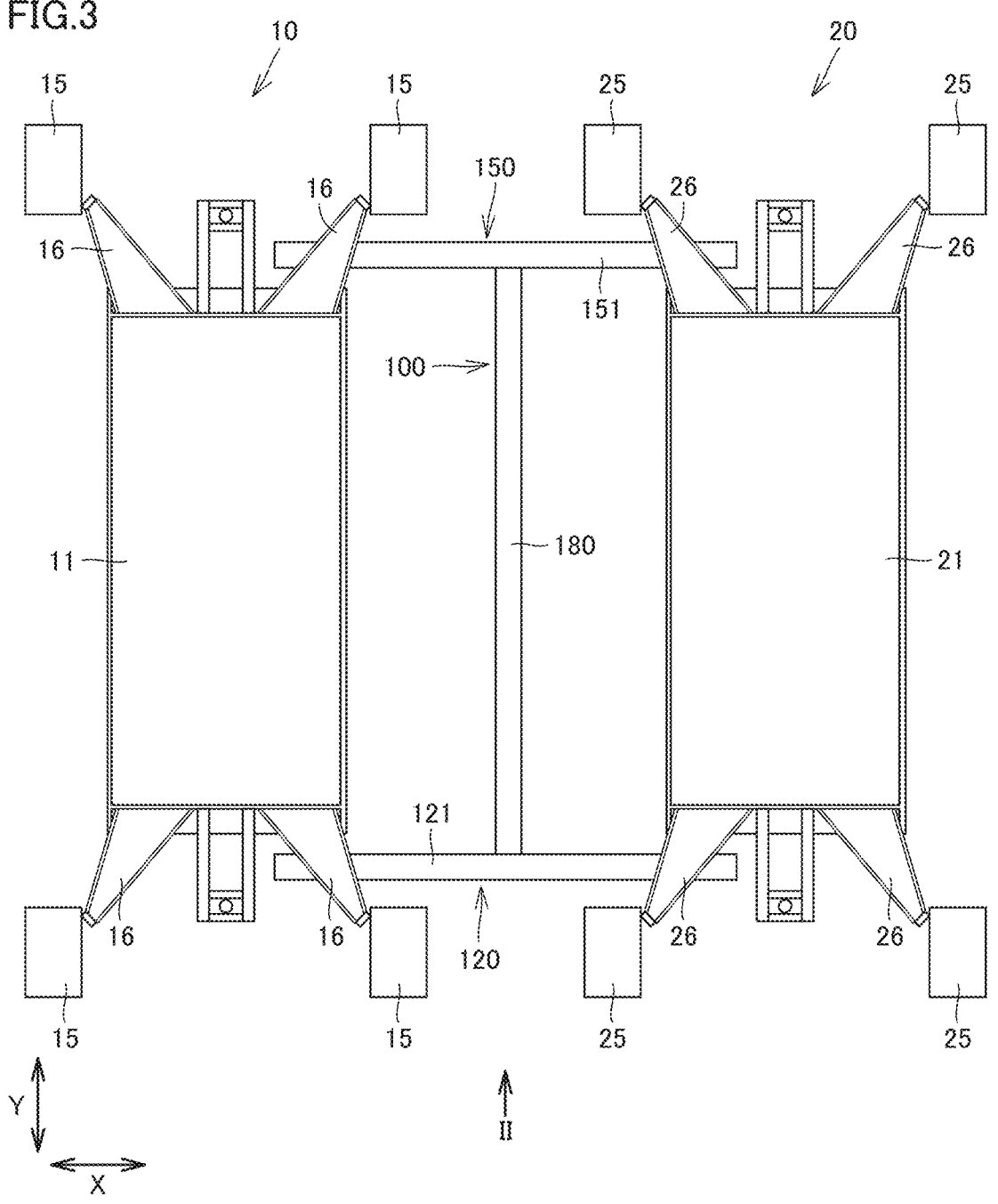
FIG. 3 is a plan view of the press system.

FIG. 3 is a plan view of the press system shown in FIG. 2. FIG. 2 shows a side view of the press system when viewed in a direction of an arrow II shown in FIG. 3.

Workpiece transport device 100 includes a first drive 120 disposed on one side in right-left direction Y, and a second drive 150 disposed on the other side in right-left direction Y. First drive 120 has a guide rail 121 extending in transport direction X. Second drive 150 has a guide rail 151 extending in transport direction X. Guide rails 121 and 151 are configured to be immovable. Guide rails 121 and 151 are fixed, for example, to uprights 15 and 25 of press machines 10 and 20. The length of guide rails 121 and 151 in transport direction X is greater than the space between press machines 10 and 20.

Referring also to FIG. 2, guide rails 121 and 151 are disposed below slide arms 16 and 26. Guide rails 121 and 151 are disposed below the lower limit position of a movable range of slide arms 16 and 26 that are movable in the up-down direction. In the plan view shown in FIG. 3, guide rails 121 and 151 overlap slide arms 16 and 26.

Guide rails 121 and 151 extend beyond uprights 15 of press machine 10. Upstream ends of guide rails 121 and 151 in transport direction X are located upstream of uprights 15 of press machine 10 in transport direction X. Guide rails 121 and 151 are partially disposed inside press machine 10. Guide rails 121 and 151 extend beyond uprights 25 of press machine 20. Downstream ends of guide rails 121 and 151 in transport direction X are located downstream of uprights 25 of press machine 20 in transport direction X. Guide rails 121 and 151 are partially disposed inside press machine 20.

Guide rails 121 and 151 extend over slide 11 of press machine 10 and slide 21 of press machine 20. Guide rails 121 and 151 bridge between the space between upper die 12 and lower die 14 of press machine 10, and the space between upper die 22 and lower die 24 of press machine 20. Guide rails 121 and 151 overlap slides 11 and 21 when viewed in a direction orthogonal to a plane defined by transport direction X and up-down direction Z, namely, when viewed in right-left direction Y (a direction perpendicular to the plane of FIG. 2).

Workpiece transport device 100 further includes a crossbar 180. Crossbar 180 extends in right-left direction Y. Crossbar 180 is disposed below and away from guide rails 121 and 151. Crossbar 180 has one end supported by first drive 120 and the other end supported by second drive 150. Crossbar 180 bridges between first drive 120 and second drive 150.

Crossbar 180 holds the workpiece in a middle portion between the one end and the other end. Crossbar 180 corresponds to a holding portion in the embodiment. Crossbar 180 has a vacuum cup in the middle portion, for example, and can hold the workpiece by using a vacuum to suck the workpiece.

After the workpiece has been pressed by press machine 10, crossbar 180 enters the space between upper die 12 and lower die 14 and holds the workpiece. First drive 120 and second drive 150 move crossbar 180 along a predetermined operation trajectory while crossbar 180 holds the workpiece, to thereby transport the workpiece from press machine 10 to press machine 20. Crossbar 180 enters the space between upper die 22 and lower die 24 of press machine 20 and releases the holding of the workpiece, to thereby deliver the workpiece to press machine 20.

Figure 4:
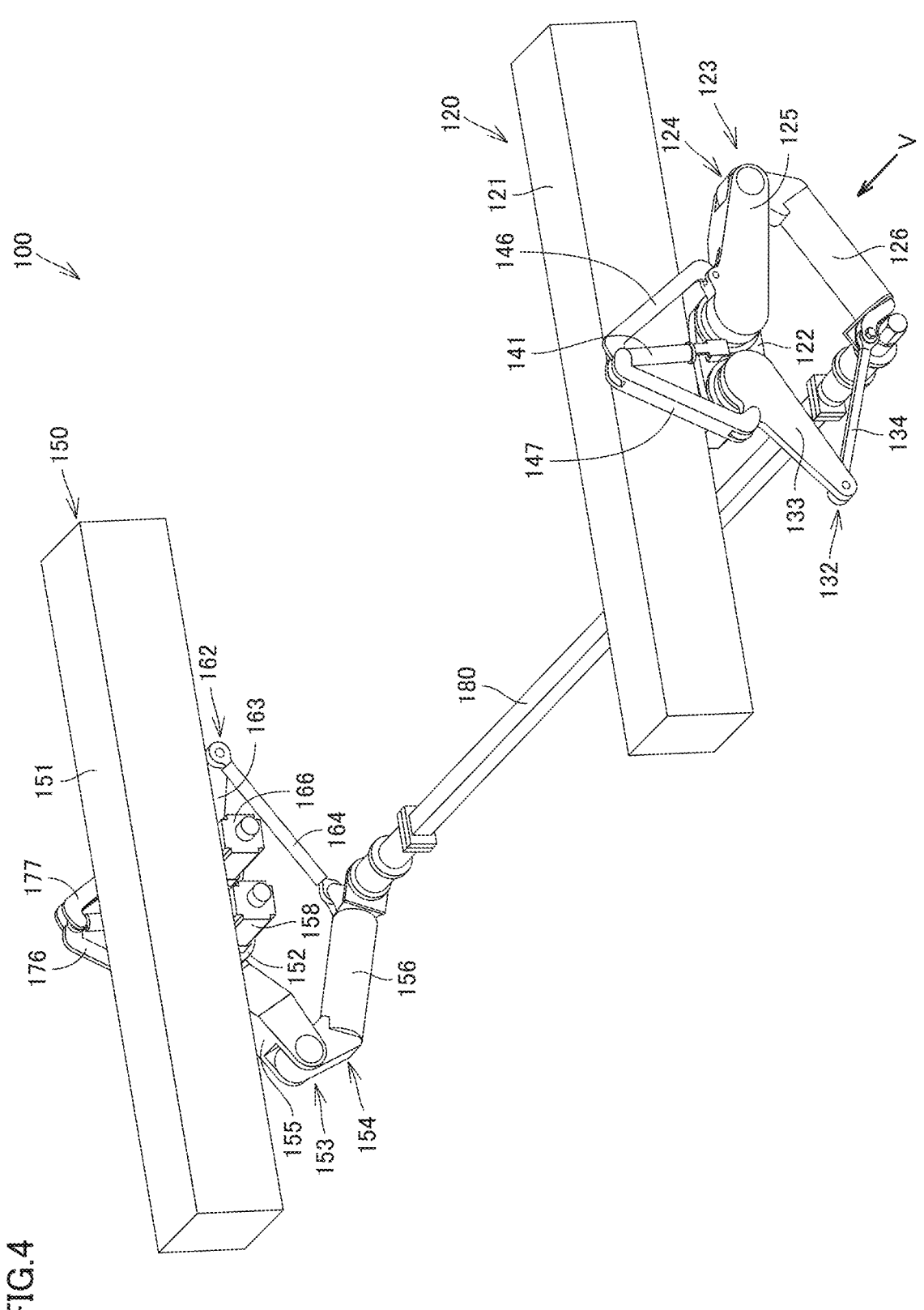
FIG. 4 is a perspective view of a workpiece transport device.
Figure 5:
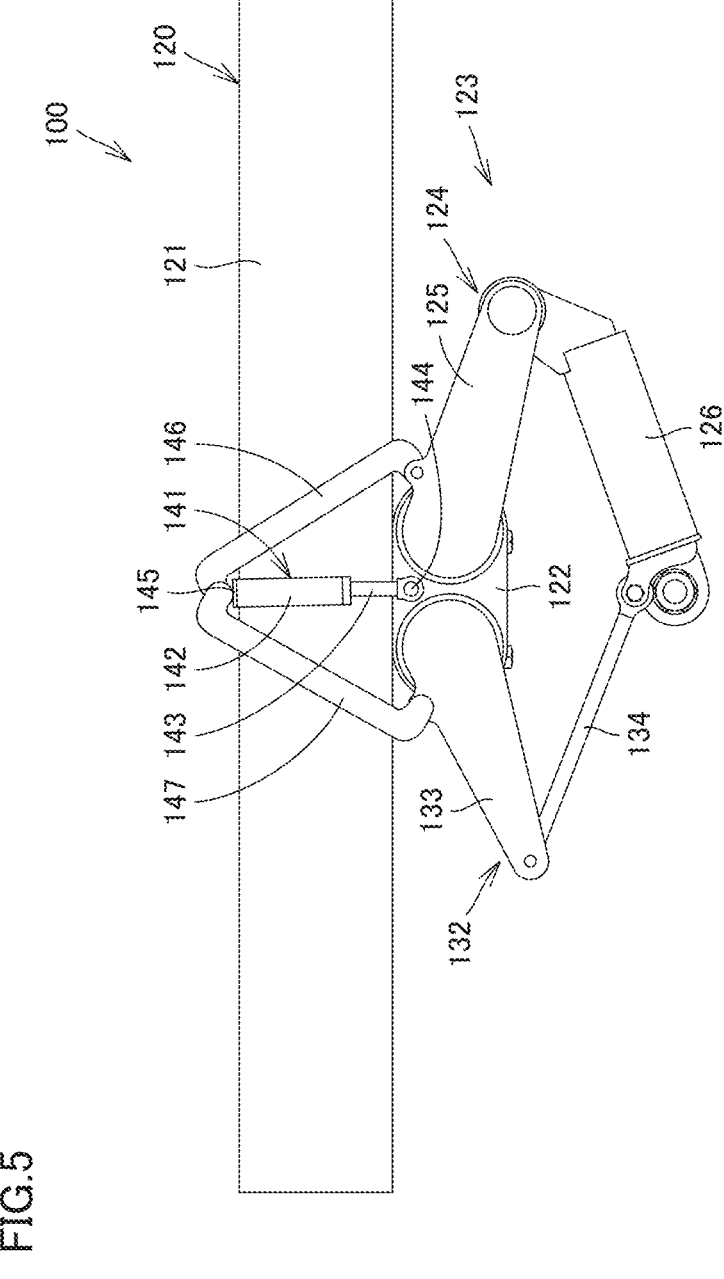
FIG. 5 is a side view of the workpiece transport device when viewed in a direction of an arrow V shown in FIG. 4.
Figure 6:
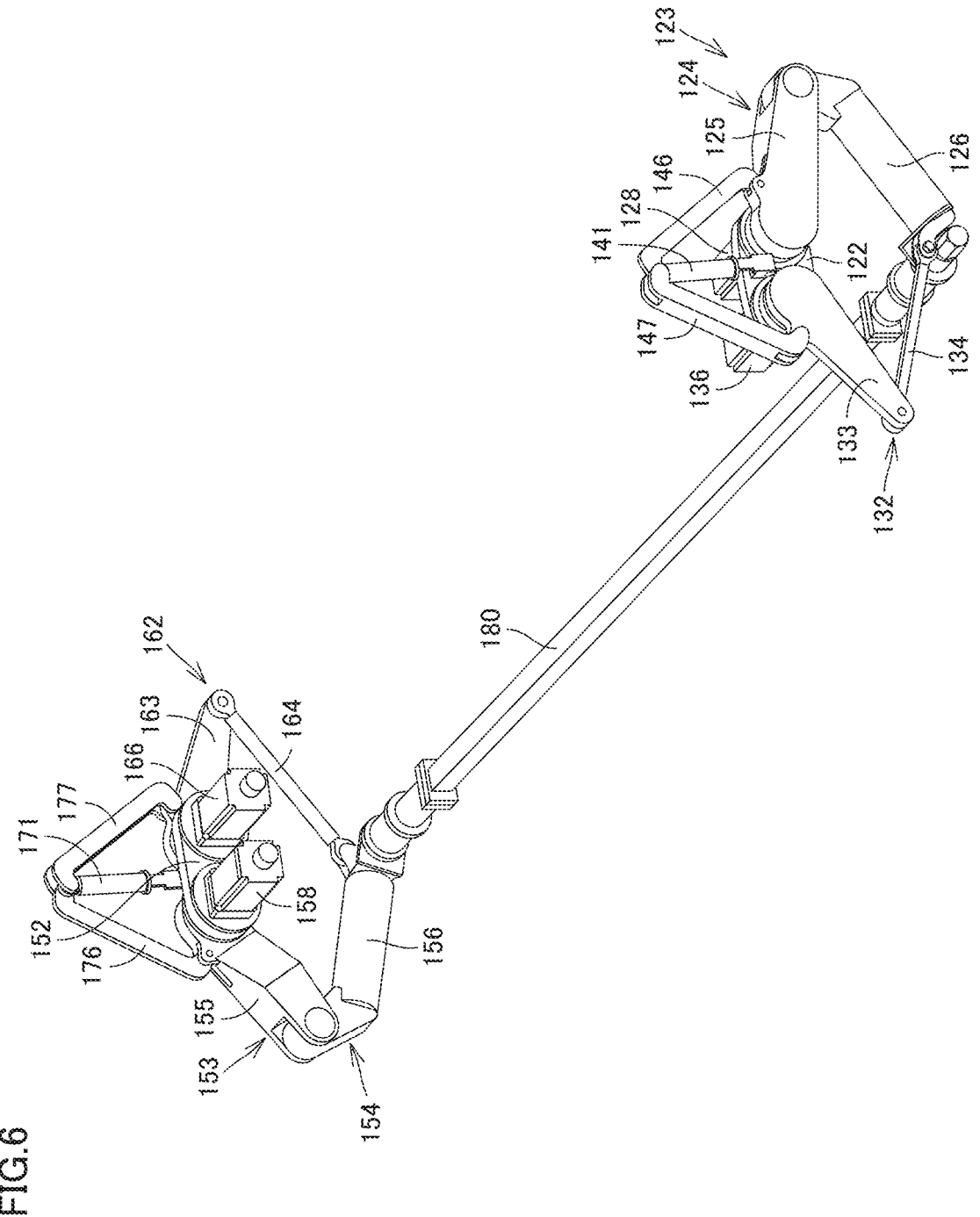
FIG. 6 is a perspective view of the workpiece transport device shown in FIG. 4, excluding guide rails.

FIG. 4 is a perspective view of workpiece transport device 100. FIG. 5 is a side view of workpiece transport device 100 when viewed in a direction of an arrow V shown in FIG. 4. FIG. 6 is a perspective view of workpiece transport device 100 shown in FIG. 4, excluding guide rails 121 and 151.

First drive 120 has a base portion 122. Base portion 122 is supported on guide rail 121. Base portion 122 shown in FIGS. 4 to 6 is attached to a lower surface of guide rail 121, and is suspended from guide rail 121. Base portion 122 may be mounted on an upper surface of guide rail 121, or may be attached to a side surface of guide rail 121.

Base portion 122 is configured to be movable along guide rail 121 in transport direction X in which the workpiece is transported. Base portion 122 moves relative to guide rail 121 by a travel driving force being transmitted to base portion 122 from a driving source (not shown) such as a motor. Base portion 122 reciprocates between one end and the other end of guide rail 121.

A power transmission device that transmits the travel driving force to base portion 122 may include a rack and pinion mechanism, a timing belt, or a ball screw. The driving source for moving base portion 122 may be a linear motor.

First drive 120 has a parallel mechanism 123. Parallel mechanism 123 is supported on base portion 122. Parallel mechanism 123 includes a first arm portion 124 and a second arm portion 132 that are in parallel with each other.

First arm portion 124 has a lever 125 and a link 126. Lever 125 is attached to base portion 122 so as to be rotatable relative to base portion 122. Lever 125 has a base end attached to base portion 122, and a tip end opposite to the base end. Link 126 is attached to lever 125 so as to be rotatable relative to lever 125. Link 126 has a base end attached to the tip end of lever 125, and a tip end opposite to the base end. Crossbar 180 is attached to the tip end of link 126. Crossbar 180 is supported on a tip end portion of parallel mechanism 123.

Second arm portion 132 has a lever 133 and a link 134. Lever 133 is attached to base portion 122 so as to be rotatable relative to base portion 122. Lever 133 has a base end attached to base portion 122, and a tip end opposite to the base end. Link 134 is attached to lever 133 so as to be rotatable relative to lever 133. Link 134 has a base end attached to the tip end of lever 133, and a tip end opposite to the base end. The tip end of link 134 is coupled to the tip end of link 126 so as to be rotatable relative to link 126. The tip end of link 134 is not coupled to crossbar 180, but is coupled to link 126. The tip end of link 134 may be directly coupled to crossbar 180.

Lever 125 and link 126 of first arm portion 124 and lever 133 and link 134 of second arm portion 132 form an articulated link mechanism coupled in parallel from base portion 122 to crossbar 180. Parallel mechanism 123 moves one crossbar 180 through two first arm portion 124 and second arm portion 132 in parallel with each other.

Lever 125 of first arm portion 124 is formed to have a greater thickness than lever 133 of second arm portion 132. Link 126 of first arm portion 124 is formed to have a greater diameter than link 134 of second arm portion 132. Thus, first arm portion 124 has a higher torsional rigidity than second arm portion 132.

An actuator is mounted on base portion 122. The actuator includes a motor 128 and a motor 136. The actuator generates a driving force for driving parallel mechanism 123.

Motors 128 and 136 are mounted on base portion 122, and are disposed on a side of base portion 122 opposite to the side on which first arm portion 124 and second arm portion 132 are disposed. Base portion 122 is located between motor 128 and first arm portion 124, and base portion 122 is located between motor 136 and second arm portion 132. The weights of motors 128 and 136 are supported by guide rail 121 through base portion 122. The weight of motor 128 does not act on first arm portion 124, and the weight of motor 136 does not act on second arm portion 132.

Motor 128 exerts a driving force on first arm portion 124 for moving first arm portion 124 relative to base portion 122. The driving force generated by motor 128 is transmitted to first arm portion 124 after being reduced in number of revolutions and increased in torque by a reduction gear (not shown). Motor 136 exerts a driving force on second arm portion 132 for moving second arm portion 132 relative to base portion 122 independently of first arm portion 124. The driving force generated by motor 136 is transmitted to second arm portion 132 after being reduced in number of revolutions and increased in torque by a reduction gear (not shown).

Motors 128 and 136 are actuators that generate a driving force for driving parallel mechanism 123, and are mounted on base portion 122. An actuator that generates a driving force for driving parallel mechanism 123 is not mounted on first arm portion 124 and second arm portion 132.

Parallel mechanism 123 can operate, with the driving forces received from motors 128 and 136, in the plane defined by transport direction X and up-down direction Z.

First arm portion 124 and second arm portion 132 forming parallel mechanism 123 move parallel to the plane of FIG. 5. The operation of parallel mechanism 123 changes the position of crossbar 180 attached to the tip end of link 126 relative to base portion 122.

First drive 120 has one gas spring 141. Gas spring 141 is mounted on base portion 122.

Specifically, gas spring 141 has a cylinder 142 and a rod 143. A sealed space is formed inside cylinder 142, with a high-pressure gas enclosed in this sealed space. Rod 143 has one end coupled to a piston disposed in the sealed space of cylinder 142, and has the other end protruding from cylinder 142 and disposed outside of cylinder 142. The other end of rod 143 is rotatably coupled to base portion 122.

To cylinder 142 of gas spring 141, a first coupling member 146 and a second coupling member 147 are coupled. First coupling member 146 is coupled to lever 125 of first arm portion 124. Second coupling member 147 is coupled to lever 133 of second arm portion 132. First coupling member 146 and second coupling member 147 are each formed as a rigid body having an unchanging length.

Cylinder 142 has one end where rod 143 protrudes from cylinder 142 and the other end, with first coupling member 146 and second coupling member 147 coupled to the other end of cylinder 142. Gas spring 141 has, as a whole, one end 144 attached to base portion 122, and an other end 145 to which first coupling member 146 and second coupling member 147 are coupled.

Rod 143 is biased, by the high-pressure gas inside cylinder 142, in a direction in which rod 143 is pushed out of cylinder 142. Gas spring 141 is, as a whole, biased in a direction in which the length from one end 144 to other end 145 increases. As gas spring 141 is biased in a direction in which other end 145 moves away from base portion 122, first coupling member 146 and second coupling member 147 coupled to other end 145 are biased upward. With this, lever 125 coupled to first coupling member 146 and lever 133 coupled to second coupling member 147 are biased upward. Gas spring 141 has the function of a biasing member to bias both first arm portion 124 and second arm portion 132 upward.

Second drive 150 has the same configuration as first drive 120, and is disposed as a 180° inverted version of first drive 120. As shown in FIGS. 4 and 6, each component of second drive 150 is denoted by a reference number with the addition of 30 to the reference number of a corresponding component of first drive 120. A detailed description of the configuration of second drive 150 is the same as that of first drive 120.

Second drive 150 has a parallel mechanism 153. Parallel mechanism 153 is supported on base portion 152. Parallel mechanism 153 includes a first arm portion 154 and a second arm portion 162 that are in parallel with each other.

First arm portion 154 has a lever 155 and a link 156. Lever 155 is attached to base portion 152 so as to be rotatable relative to base portion 152. Lever 155 has a base end attached to base portion 152, and a tip end opposite to the base end. Link 156 is attached to lever 155 so as to be rotatable relative to lever 155. Link 156 has a base end attached to the tip end of lever 155, and a tip end opposite to the base end. Crossbar 180 is attached to the tip end of link 156. Crossbar 180 is supported on a tip end portion of parallel mechanism 153.

Second arm portion 162 has a lever 163 and a link 164. Lever 163 is attached to base portion 152 so as to be rotatable relative to base portion 152. Lever 163 has a base end attached to base portion 152, and a tip end opposite to the base end. Link 164 is attached to lever 163 so as to be rotatable relative to lever 163. Link 164 has a base end attached to the tip end of lever 163, and a tip end opposite to the base end. The tip end of link 164 is coupled to the tip end of link 156 so as to be rotatable relative to link 156. The tip end of link 164 is not coupled to crossbar 180, but is coupled to link 156. The tip end of link 164 may be directly coupled to crossbar 180.

Lever 155 and link 156 of first arm portion 154 and lever 163 and link 164 of second arm portion 162 form an articulated link mechanism coupled in parallel from base portion 152 to crossbar 180. Parallel mechanism 153 moves one crossbar 180 through two first arm portion 154 and second arm portion 162 in parallel with each other.

Lever 155 of first arm portion 154 is formed to have a greater thickness than lever 163 of second arm portion 162. Link 156 of first arm portion 154 is formed to have a greater diameter than link 164 of second arm portion 162. Thus, first arm portion 154 has a higher torsional rigidity than second arm portion 162.

An actuator is mounted on base portion 152. The actuator includes a motor 158 and a motor 166. The actuator generates a driving force for driving parallel mechanism 153.

Motors 158 and 166 are mounted on base portion 152, and are disposed on a side of base portion 152 opposite to the side on which first arm portion 154 and second arm portion 162 are disposed. Base portion 152 is located between motor 158 and first arm portion 154, and base portion 152 is located between motor 166 and second arm portion 162. The weights of motors 158 and 166 are supported by guide rail 151 through base portion 152. The weight of motor 158 does not act on first arm portion 154, and the weight of motor 166 does not act on second arm portion 162.

Motor 158 exerts a driving force on first arm portion 154 for moving first arm portion 154 relative to base portion 152. The driving force generated by motor 158 is transmitted to first arm portion 154 after being reduced in number of revolutions and increased in torque by a reduction gear (not shown). Motor 166 exerts a driving force on second arm portion 162 for moving second arm portion 162 relative to base portion 152 independently of first arm portion 154. The driving force generated by motor 166 is transmitted to second arm portion 162 after being reduced in number of revolutions and increased in torque by a reduction gear (not shown).

Motors 158 and 166 are actuators that generate a driving force for driving parallel mechanism 153, and are mounted on base portion 152. An actuator that generates a driving force for driving parallel mechanism 153 is not mounted on first arm portion 154 and second arm portion 162.

Parallel mechanism 153 can operate, with the driving forces received from motors 158 and 166, in the plane defined by transport direction X and up-down direction Z. First arm portion 154 and second arm portion 162 forming parallel mechanism 153 move parallel to the plane of FIG. 5. The operation of parallel mechanism 153 changes the position of crossbar 180 attached to the tip end of link 156 relative to base portion 152.

Second drive 150 has one gas spring 171. Gas spring 171 is mounted on base portion 152.

Specifically, gas spring 171 has a cylinder 172 and a rod 173. A sealed space is formed inside cylinder 172, with a high-pressure gas enclosed in this sealed space. Rod 173 has one end coupled to a piston disposed in the sealed space of cylinder 172, and has the other end protruding from cylinder 172 and disposed outside of cylinder 172. The other end of rod 173 is rotatably coupled to base portion 152.

To cylinder 172 of gas spring 171, a first coupling member 176 and a second coupling member 177 are coupled. First coupling member 176 is coupled to lever 155 of first arm portion 154. Second coupling member 177 is coupled to lever 163 of second arm portion 162. First coupling member 176 and second coupling member 177 are each formed as a rigid body having an unchanging length.

Cylinder 172 has one end where rod 173 protrudes from cylinder 172 and the other end, with first coupling member 176 and second coupling member 177 coupled to the other end of cylinder 172. Gas spring 171 has, as a whole, one end 174 attached to base portion 152, and an other end 175 to which first coupling member 176 and second coupling member 177 are coupled.

Rod 173 is biased, by the high-pressure gas inside cylinder 172, in a direction in which rod 173 is pushed out of cylinder 172. Gas spring 171 is, as a whole, biased in a direction in which the length from one end 174 to other end 175 increases. As gas spring 171 is biased in a direction in which other end 175 moves away from base portion 152, first coupling member 176 and second coupling member 177 coupled to other end 175 are biased upward. With this, lever 175 coupled to first coupling member 176 and lever 173 coupled to second coupling member 177 are biased upward. Gas spring 171 has the function of a biasing member to bias both first arm portion 154 and second arm portion 152 upward.

Crossbar 180 moves along a constant operation trajectory due to a combined motion of the reciprocating movement of base portions 122 and 152 in transport direction X relative to guide rails 121 and 151, and the movement of crossbar 180 with respect to base portions 122 and 152 by parallel mechanisms 123 and 153.

Figure 7:
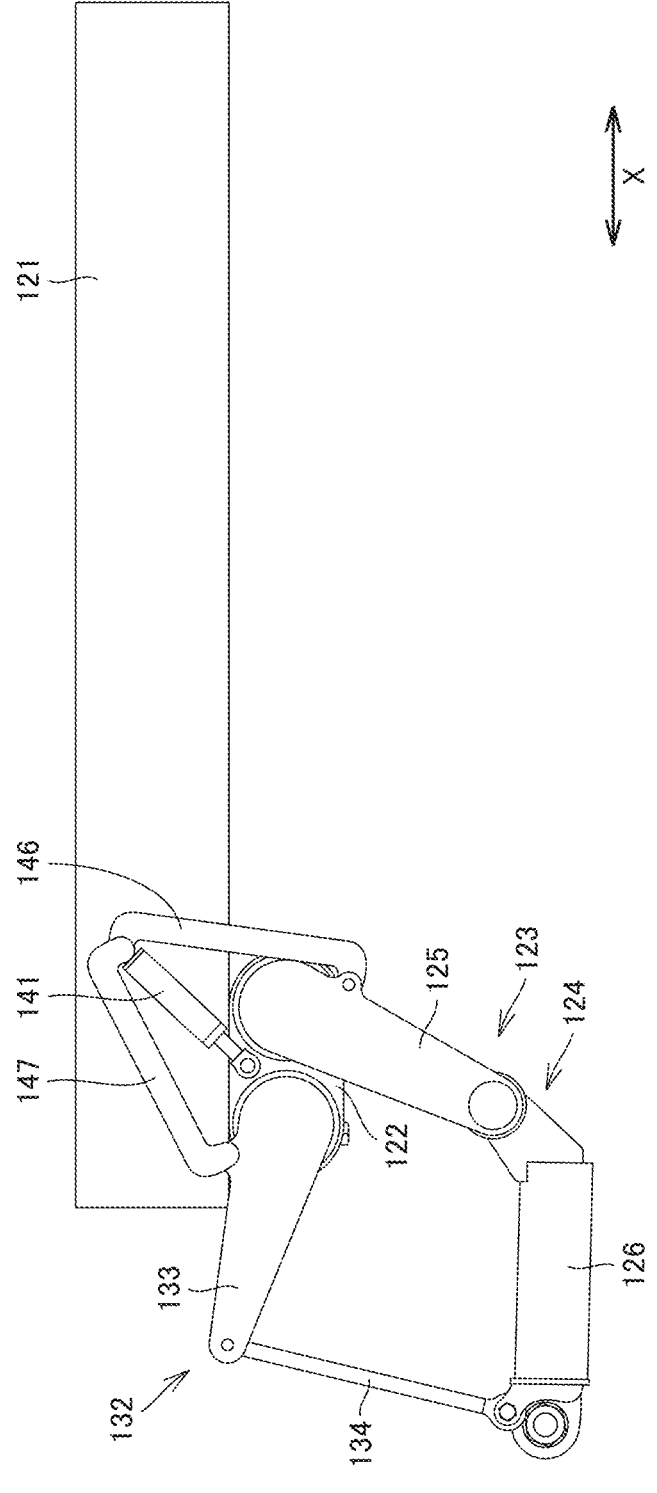
FIG. 7 is a side view of a first drive, with a crossbar disposed at the most upstream position in a transport direction.

FIG. 7 is a side view of first drive 120, with crossbar 180 disposed at the most upstream position in transport direction X. Base portion 122 moves along guide rail 121 to the most upstream position in transport direction X, and at this position, motor 128 is driven to move lever 125 of first arm portion 124 clockwise in FIG. 7, and motor 136 is driven to move lever 133 of second arm portion 132 clockwise in FIG. 7. Crossbar 180 is thereby disposed at the most upstream position in transport direction X as shown in FIG. 7.

At this point, crossbar 180 has entered the space between upper die 12 and lower die 14 of press machine 10. Crossbar 180 uses the vacuum cup or the like to hold the workpiece that has been pressed by press machine 10, thereby allowing workpiece transport device 100 to transport the workpiece out of press machine 10.

Figure 8:
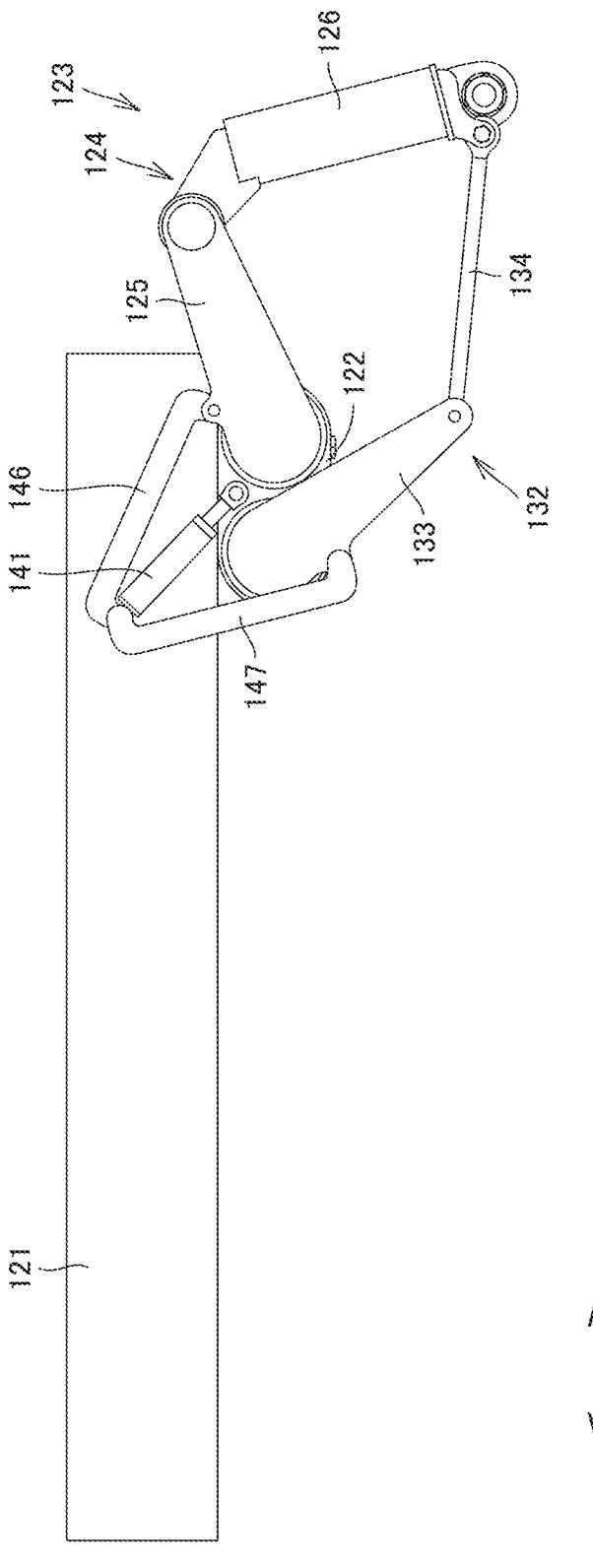
FIG. 8 is a side view of the first drive, with the crossbar disposed at the most downstream position in the transport direction.

FIG. 8 is a side view of first drive 120, with crossbar 180 disposed at the most downstream position in transport direction X. Base portion 122 moves along guide rail 121 to the most downstream position in transport direction X, and at this position, motor 128 is driven to move lever 125 of first arm portion 124 counterclockwise in FIG. 8, and motor 136 is driven to move lever 133 of second arm portion 132 counterclockwise in FIG. 8. Crossbar 180 is thereby disposed at the most downstream position in transport direction X as shown in FIG. 8.

At this point, crossbar 180 has entered the space between upper die 22 and lower die 24 of press machine 20. The holding of the workpiece by crossbar 180 is released at this position, so as to transport the workpiece that has been transported by workpiece transport device 100 into press machine 20. This allows press machine 20 to perform the next pressing on the workpiece.

FIGS. 9 to 14 are diagrams showing movement of crossbar 180 along a predetermined operation trajectory T. FIGS.

Figure 9:
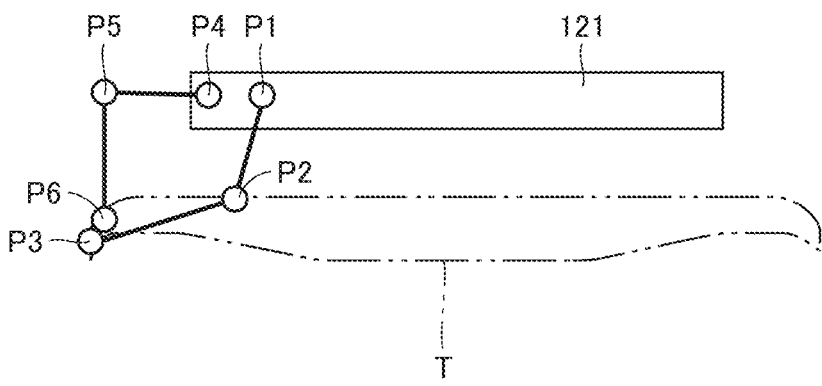
FIG. 9 is a first diagram showing movement of the crossbar along an operation trajectory.

9 to 14 schematically show guide rail 121 as well as first arm portion 124 and second arm portion 132 of first drive 120 in a side view similar to FIGS. 7 and 8. FIG. 9 schematically shows the locations of first arm portion 124 and second arm portion 132 shown in FIG. 7, and FIG. 13 schematically shows the locations of first arm portion 124 and second arm portion 132 shown in FIG. 8.

A point P1 shown in FIGS. 9 to 14 indicates a coupling point between base portion 122 and lever 125, and the center of rotation of lever 125 with respect to base portion 122. A point P2 indicates a coupling point between lever 125 and link 126, and the center of rotation of link 126 with respect to lever 125. A point P3 indicates a coupling point between lever 125 and crossbar 180. A point P4 indicates a coupling point between base portion 122 and lever 133, and the center of rotation of lever 133 with respect to base portion 122. A point P5 indicates a coupling point between lever 133 and link 134, and the center of rotation of link 134 with respect to lever 133. A point P6 indicates a coupling point between link 126 and link 134. Operation trajectory T indicated by a chain-double-dotted line in FIGS. 9 to 14 indicates a trajectory of movement of crossbar 180 by base portion 122 and parallel mechanism 123.

Figure 10:
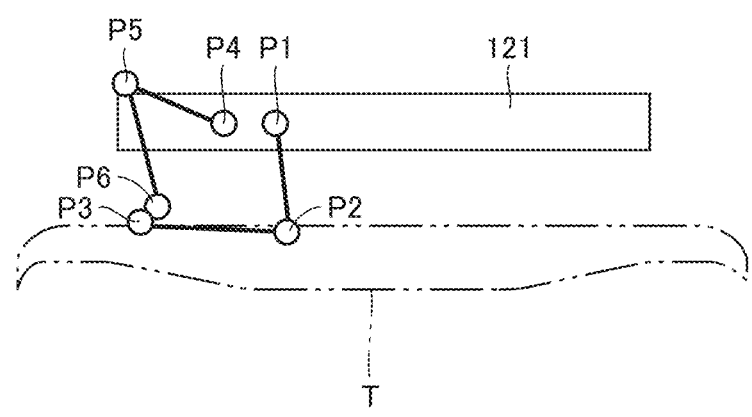
FIG. 10 is a second diagram showing movement of the crossbar along the operation trajectory.

Crossbar 180 is moved to the most upstream position in transport direction X shown in FIG. 9, and the workpiece that has been pressed by press machine 10 is held by crossbar 180. As shown in FIG. 10, base portion 122 is moved downstream in transport direction X, lever 125 is moved counterclockwise in the figure, and lever 133 is moved clockwise in the figure, so as to lift the workpiece held by crossbar 180 and remove the workpiece from press machine 10.

Figure 11:
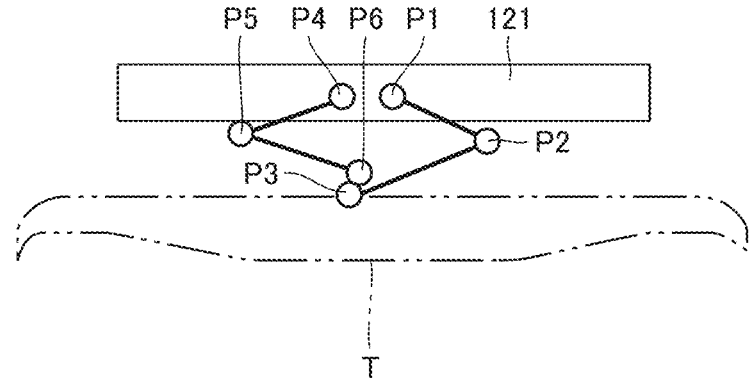
FIG. 11 is a third diagram showing movement of the crossbar along the operation trajectory.

As shown in FIGS. 11 and 12, base portion 122 is moved downstream in transport direction X, lever 125 is moved counterclockwise in the figure, and lever 133 is moved counterclockwise in the figure, so as to transport the workpiece held by crossbar 180 toward press machine 20. Crossbar 180 is moved to the most downstream position in transport direction X shown in FIG. 13, lever 125 and lever 133 are moved clockwise in the figure, and the holding of the workpiece by crossbar 180 is released, so as to place the workpiece on lower die 24 of press machine 20.

After the workpiece has been transported into press machine 20, as shown in FIG. 14, base portion 122 is moved upstream in transport direction X, lever 125 is moved clockwise in the figure, and lever 133 is moved clockwise in the figure, so as to move crossbar 180 upstream in transport direction X for the transport of the next workpiece.

Characteristic features and functions and advantageous effects of the present embodiment will be summarized as below, although some description may overlap with the description above.

As shown in FIG. 5, workpiece transport device 100 in the embodiment includes base portion 122 and parallel mechanism 123. Parallel mechanism 123 is supported on base portion 122. Parallel mechanism 123 is configured to change the position of crossbar 180 relative to base portion 122 by operating in the plane defined by transport direction X and up-down direction Z. As shown in FIG. 6, workpiece transport device 100 further includes motors 128 and 136. Motors 128 and 136 are mounted on base portion 122. Motors 128 and 136 generate a driving force for driving parallel mechanism 123.

By using parallel mechanism 123 as a mechanism for moving crossbar 180, motors 128 and 136 for driving parallel mechanism 123 can be mounted on base portion 122. Motors 128 and 136 are supported by base portion 122, and the weights of motors 128 and 136 do not act on first arm portion 124 and second arm portion 132 of parallel mechanism 123. An increase in weight of parallel mechanism 123 driven by motors 128 and 136 is avoided, which allows parallel mechanism 123 to be readily driven. Therefore, a transport speed of the workpiece held by crossbar 180 at the tip end of parallel mechanism 123 can be improved, leading to increased productivity of press machines 10 and 20.

As shown in FIG. 5, parallel mechanism 123 includes first arm portion 124 and second arm portion 132 that are in parallel with each other. As shown in FIGS. 7 and 8, motor 128 exerts a driving force on first arm portion 124 for moving first arm portion 124 relative to base portion 122. Motor 136 exerts a driving force on second arm portion 132 for moving second arm portion 132 relative to base portion 122. Thus, first arm portion 124 can be driven by motor 128 mounted on base portion 122, and second arm portion 132 can be driven by motor 136 mounted on base portion 122.

As shown in FIG. 5, first arm portion 124 has a higher torsional rigidity than second arm portion 132. Thus, torsional rigidity required of parallel mechanism 123 can be ensured, and as compared to when first arm portion 124 and second arm portion 132 have an equal torsional rigidity, the weight of parallel mechanism 123 as a whole can be reduced and costs can be reduced. Therefore, optimization of parallel mechanism 123 can be achieved.

As shown in FIGS. 7 and 8, base portion 122 is configured to be movable in transport direction X. If base portion 122 is configured to be immovable in transport direction X, the length of first arm portion 124 and second arm portion 132 of parallel mechanism 123 needs to be increased to achieve the workpiece transport between the dies. Since base portion 122 is movable, parallel mechanism 123 supported on base portion 122 is movable as a whole in transport direction X. Even if the length of first arm portion 124 and second arm portion 132 of parallel mechanism 123 is reduced, the workpiece can be transported between the space between dies 12 and 14 of press machine 10 and the space between dies 22 and 24 of press machine 20.

The reduced length of first arm portion 124 and second arm portion 132 increases the torsional rigidities of first arm portion 124 and second arm portion 132, which allows for reduced vibration of crossbar 180. The size of workpiece transport device 100 can be reduced, which allows for cost reduction. Interference between workpiece transport device 100 and press machines 10, 20 can be readily avoided, which allows for improved reliability of the press system. Further, workpiece transport device 100 suitable for retrofitting a workpiece transport device of an existing press system can be achieved.

As shown in FIGS. 7 and 8, base portion 122 moves in transport direction X along guide rail 121 extending in transport direction X. During the movement of base portion 122, the weights of motors 128 and 136 mounted on base portion 122 are supported by guide rail 121, which can ensure that the weights of motors 128 and 136 do not act on parallel mechanism 123.

As shown in FIGS. 2 and 3, guide rail 121 is disposed below slide arms 16 and 26. Interference between workpiece transport device 100 and press machines 10, 20 can be reliably avoided, which can ensure the productivity of pressing by press machines 10 and 20.

As shown in FIG. 2, guide rail 121 overlaps slides 11 and 21 when viewed in right-left direction Y. The increased movement distance of base portion 122 in transport direction X along guide rail 121 allows for a further reduced length of first arm portion 124 and second arm portion 132 of parallel mechanism 123. Therefore, workpiece transport device 100 can be further reduced in size.

As shown in FIG. 5, one gas spring 141 mounted on base portion 122 biases both first arm portion 124 and second arm portion 132 upward.

Figure 15:
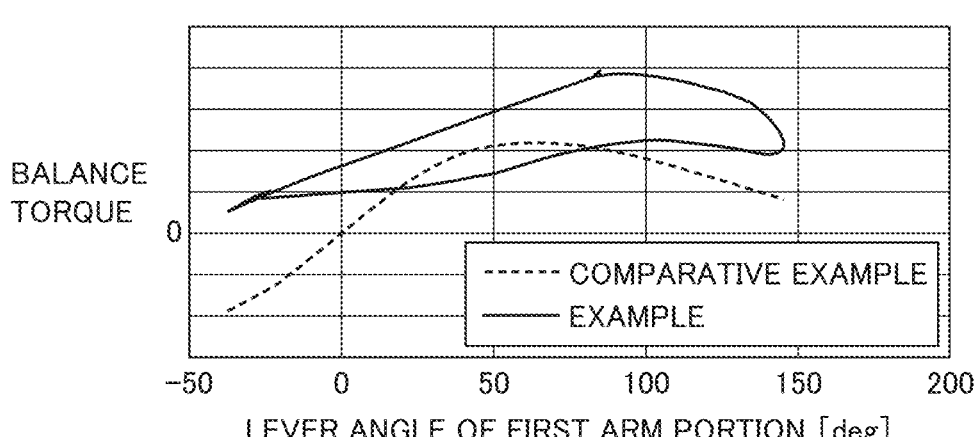
FIG. 15 is a graph showing a torque acting on an arm portion by a gas spring in each of an example and a comparative example.

FIG. 15 is a graph showing a torque acting on the arm portion by the gas spring in each of an example and a comparative example. The horizontal axis of the graph shown in FIG. 15 represents an angle of lever 125 of first arm portion 124. An angle of 0° indicates when the direction in which lever 125 extends coincides with the down direction of up-down direction Z, and a positive angular range indicates a range in which lever 125 as seen in a side view moves counterclockwise in the figure from the down direction. A balance torque on the vertical axis of the graph shown in FIG. 15 represents the magnitude of a torque that acts on lever 125 and biases lever 125 upward. The higher the balance torque, the greater the function of the gas spring as a counterbalancer to lift lever 125 upward.

The example indicated by a solid line in FIG. 15 shows the configuration of the embodiment, in which one gas spring 141 biases both first arm portion 124 and second arm portion 132 upward. The comparative example indicated by a broken line in FIG. 15 shows an example in which a gas spring for biasing first arm portion 124 upward and a gas spring for biasing second arm portion 132 upward are separately provided.

As shown in FIG. 15, in the example, a torque of at least a certain magnitude can be generated across the entire angular range. As a whole, the example has a higher balance torque than the comparison example. In the comparative example, there is an angular range where the balance torque becomes negative, and the function of a counterbalancer may not be provided. Therefore, the example is better than the comparative example as a counterbalancer.

Since both first arm portion 124 and second arm portion 132 forming parallel mechanism 123 are biased upward by one gas spring 141, a required stroke of gas spring 141 can be reduced. The size of gas spring 14 can be reduced, or the torque can be increased by placing a fulcrum at a more distant position while keeping the same stroke of gas spring 141 as is conventionally provided.

The conditions for use of gas spring 141 are relaxed, which allows for an increased life or reduced size of gas spring 141. The load on motors 128 and 136 is reduced, and motors 128 and 136 can be operated under more relaxed conditions, which allows for an increased life or reduced size of motors 128 and 136. The effect of lifting first arm portion 124 and second arm portion 132 can reduce the dead weights of first arm portion 124 and second arm portion 132 acting on the reduction gear, which allows for an increased life or reduced size of the reduction gear.

As shown in FIG. 5, gas spring 141 has cylinder 142, and rod 143 protruding from cylinder 142. Rod 143 is rotatably coupled to base portion 122. First coupling member 146 is coupled to cylinder 142 and first arm portion 124. Second coupling member 147 is coupled to cylinder 142 and second arm portion 132. Rod 143 is biased in a direction in which it is pushed out of cylinder 142. Thus, an upward lifting force can be reliably exerted on first arm portion 124 and second arm portion 132 through first coupling member 146 and second coupling member 147.

The biasing member to bias first arm portion 124 and second arm portion 132 upward is not limited to gas spring 141. Instead of gas spring 141, a device including a hydraulic cylinder and an accumulator connected to a bottom side of the hydraulic cylinder may be used. When a rod of the hydraulic cylinder is pushed into the cylinder, hydraulic oil enclosed on the bottom side of the hydraulic cylinder is pushed out into the accumulator. The hydraulic oil is pushed back by a gas enclosed in the accumulator, which causes the rod of the hydraulic cylinder to be biased in a direction in which the rod is pushed out of the cylinder.

Second Embodiment

Figure 16:
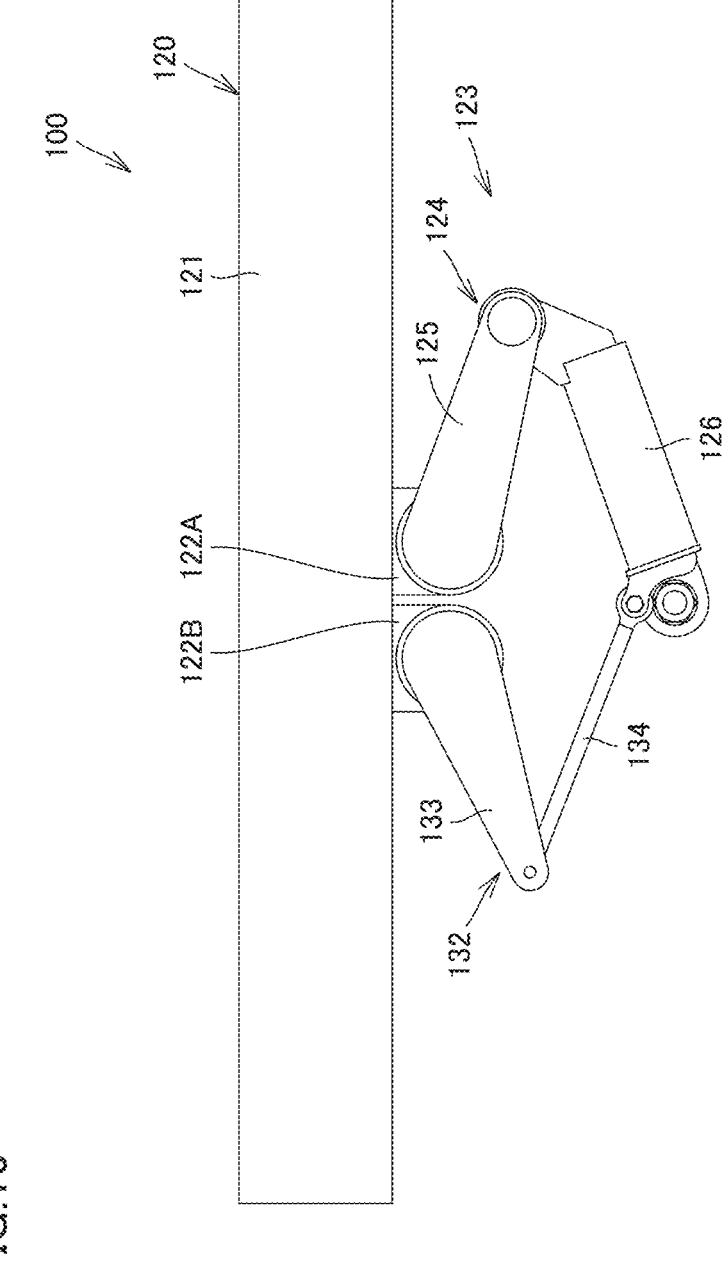
FIG. 16 is a side view of the first drive in a second embodiment.

FIG. 16 is a side view of first drive 120 in a second embodiment. In the second embodiment, the base portion is divided into two portions in transport direction X. First arm portion 124 is supported on a first base portion 122A on the downstream side in transport direction X. Second arm portion 132 is supported on a second base portion 122B on the upstream side in transport direction X. Motors 128 and 136 (not shown in FIG. 16) are mounted on base portions 122A and 122B, respectively.

With such a configuration as well, the above-described advantageous effect of preventing the weights of motors 128 and 136 from acting on first arm portion 124 and second arm portion 132 of parallel mechanism 123 can be obtained in a similar manner.

By making base portion 122A and base portion 122B independently movable in transport direction X, upward protrusion of first arm portion 124 and second arm portion 132 can be suppressed. For example, by placing point P4 shown in FIG. 10 further downstream in transport direction X, the position of point P5 in the up-down direction can be lowered. By placing point P1 shown in FIG. 12 further upstream in transport direction X, the position of point P2 in the up-down direction can be lowered. Therefore, interference between first arm portion 124, second arm portion 132 and press machines 10, 20 can be more reliably avoided, which allows for improved productivity of pressing by press machines 10 and 20, and improved reliability of the press system.

The previous embodiments have described an example in which crossbar 180 is attached to the tip end of link 126 of first arm 124 that forms parallel mechanism 123. This example is not limiting, and workpiece transport device 100 may employ a hybrid-type link mechanism that mixes parallel and serial mechanisms, in which a serial link is coupled to the tip end of link 126 and crossbar 180 is attached to the tip end of this link. In this case, a motor for driving the serial mechanism may be mounted on the tip end of link 126. With such a configuration as well, the effect of suppressing an increase in weight of the link mechanism can be obtained, since a motor for driving the parallel mechanism is mounted on the base portion.

The embodiments have described an example in which both ends of crossbar 180 are supported by first drive 120 and second drive 150 disposed on both sides in right-left direction Y. The drives supporting crossbar 180 do not necessarily need to be provided as a pair, and a single drive may support a single location of crossbar 180.

In addition, workpiece transport device 100 does not necessarily need to include crossbar 180, and may include fingers capable of advancing and retracting in right-left direction Y at the tip end portion of parallel mechanism 123 and/or the tip end portion of parallel mechanism 153, and hold the workpiece by the fingers. The fingers capable of advancing and retracting in right-left direction Y also correspond to holding portions.

Alternatively, the vacuum cup may be mounted, without a crossbar, on the tip end portion of the parallel mechanism of the drive.

The embodiments have described an example in which workpiece transport device 100 transports a workpiece between press machines 10 and 20 that form a tandem press line. Workpiece transport device 100 in the embodiment may be applied to transport a workpiece among a plurality of dies disposed in a single press machine in a transfer press line.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

10, 20 press machine; 11, 21 slide; 12, 22 upper die; 13, 23 bolster; 14, 24 lower die; 15, 25 upright; 16, 26 slide arm; 100 workpiece transport device; 120 first drive; 121, 151 guide rail; 122, 122A, 122B, 152 base portion; 123, 153 parallel mechanism; 124 first arm portion; 125, 133 lever; 126, 134 link; 128, 136 motor; 132 second arm portion; 141 gas spring; 142 cylinder; 143 rod; 144 one end; 145 other end; 146, 147 coupling member; 150 second drive; 180 crossbar.

The invention claimed is:

1. A workpiece transport device that transports a workpiece pressed by a press machine, the workpiece transport device comprising:

a base portion;

a holding portion that holds the workpiece;

a parallel mechanism supported on the base portion and configured to change a position of the holding portion relative to the base portion by operating in a plane defined by a transport direction in which the workpiece is transported and an up-down direction; and an actuator that is mounted on the base portion and generates a driving force for driving the parallel mechanism, wherein the parallel mechanism includes a first arm portion and a second arm portion that are in parallel with each other, the first arm portion includes a first lever attached to the base portion and a first link having a base end attached to the first lever and a tip end to which the holding portion is attached, and the second arm portion includes a second lever attached to the base portion and a second link having a base end attached to the second lever and a tip end coupled to the first link, and the first arm portion has a higher torsional rigidity than the second arm portion.

2. The workpiece transport device according to claim 1, wherein the actuator exerts a driving force on the first arm portion for moving the first arm portion relative to the base portion, and exerts a driving force on the second arm portion for moving the second arm portion relative to the base portion independently of the first arm portion.

3. The workpiece transport device according to claim 1, wherein the base portion is configured to be movable in the transport direction.

4. The workpiece transport device according to claim 3, further comprising a guide rail extending in the transport direction and supporting the base portion, wherein the base portion moves in the transport direction along the guide rail.

5. The workpiece transport device according to claim 4, wherein the press machine has a die that moves in the up-down direction, a slide on which the die is mounted, a columnar portion extending in the up-down direction, and an attachment portion that attaches the slide to the columnar portion such that the slide is movable in the up-down direction, and the guide rail is disposed below the attachment portion.

6. The workpiece transport device according to claim 5, wherein the guide rail overlaps the slide when viewed in a direction orthogonal to the plane.

7. The workpiece transport device according to claim 1, further comprising one biasing member that is mounted on the base portion and biases both the first arm portion and the second arm portion upward.

8. The workpiece transport device according to claim 7, wherein the biasing member is a gas spring.

9. The workpiece transport device according to claim 8, wherein the gas spring has a cylinder, and a rod protruding from the cylinder and rotatably coupled to the base portion, the workpiece transport device further comprises a first coupling member having an unchanging length and coupled to the cylinder and the first arm portion, and a second coupling member having an unchanging length and coupled to the cylinder and the second arm portion, and the rod is biased in a direction in which it is pushed out of the cylinder.

10. The workpiece transport device according to claim 5, wherein the guide rail is fixed to the press machine.

* * * * *